United States Patent [19]

Havens

[11] 4,315,963
[45] Feb. 16, 1982

[54] THERMOPLASTIC FILM WITH INTEGRAL RIBBED PATTERN AND BAG THEREFROM

[75] Inventor: Carl B. Havens, Newark, Ohio

[73] Assignee: The Dow Chemical Co., Midland, Mich.

[21] Appl. No.: 170,217

[22] Filed: Jul. 18, 1980

Related U.S. Application Data

[62] Division of Ser. No. 75,477, Sep. 14, 1979, Pat. No. 4,265,853.

[51] Int. Cl.³ .............................................. B65D 85/30
[52] U.S. Cl. ..................................... 428/35; 428/213; 428/163; 428/166; 428/167; 264/519; 428/323; 428/36
[58] Field of Search ................... 428/35, 36, 213, 163, 428/167, 166

[56] References Cited

U.S. PATENT DOCUMENTS

| | | | |
|---|---|---|---|
| 3,210,234 | 10/1965 | Baskin et al. | 428/163 |
| 3,904,465 | 9/1975 | Haase et al. | 428/166 X |
| 3,973,063 | 8/1976 | Clayton | 428/167 X |
| 3,976,733 | 8/1976 | Havens | 264/565 |
| 4,265,853 | 5/1981 | Havens | 264/237 X |

FOREIGN PATENT DOCUMENTS 568849  11/1975  Switzerland ..................... 428/163

Primary Examiner—P. Ives
Attorney, Agent, or Firm—Lloyd E. Hessenaur, Jr.

[57] ABSTRACT

A process and apparatus for producing a ribbed pattern on extruded film by differential cooling of the film during its stretching process. The film is extruded through a tubular film die, stretching as it leaves the die. Cooling mechanisms rotate about the tube as it is being extruded to define a large plurality of narrow strips on the melt as it is being extruded. The film is fixed in space to maintain a close proximity to the cooling mechanisms in order to achieve sharply defined ribs. A cross-ribbed pattern can be obtained by counter-rotating the cooling mechanisms. Increased tear strength is imparted to the film without increasing the amount of resin necessary to make the film. Such tube can be formed into high strength film products such as trash bags and the like.

5 Claims, 8 Drawing Figures

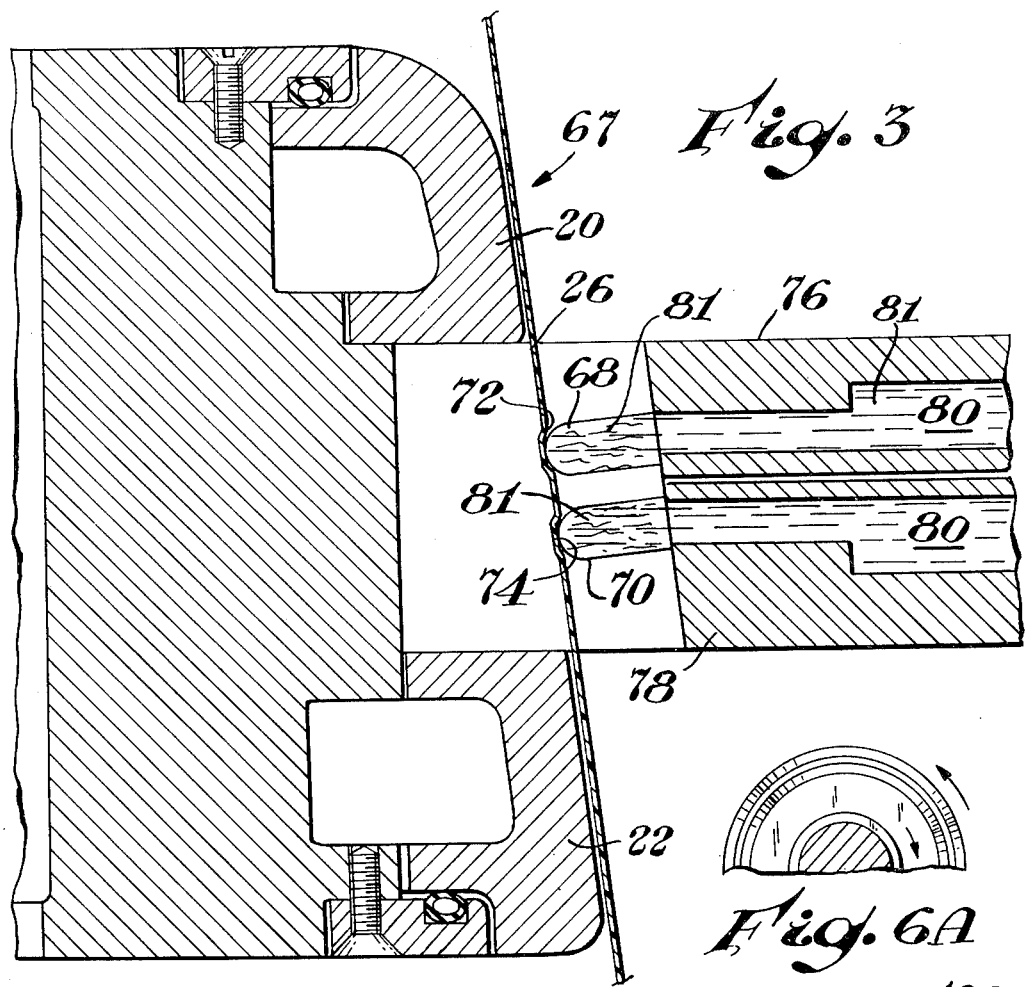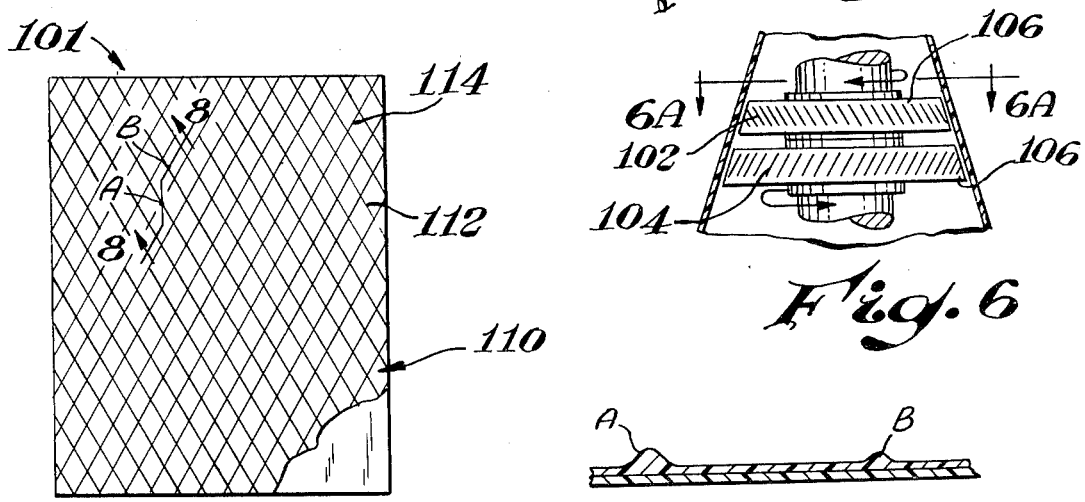

THERMOPLASTIC FILM WITH INTEGRAL RIBBED PATTERN AND BAG THEREFROM

This is a divisional of application Ser. No. 075,477, filed Sept. 14, 1979, now U.S. Pat. No. 4,265,853.

BACKGROUND OF THE INVENTION

Bags made from thin films tend to zipper or otherwise tear when punctured or stressed. It has been long desired to reduce the tendency of such thin films to zipper and tear without significantly increasing the bag thickness or weight as required in ribbed bags shown in U.S. Pat. No. 3,193,604, for example. Attempts to accomplish such a desired result can be found in U.S. Pat. No. 3,265,789 or British Pat. No. 1,250,945 which impinge air on tubular film as it is being extruded. Some amount of thickness is provided by the cooling mechanisms of these patents but the mechanisms fail to provide a configuration of rib intensity, sharpness, strength and pattern necessary to maximize the tear strength of the film without significantly increasing the resin requirements and weight of the film produced. The present invention provides a process and apparatus for producing a film having extraordinary tear strength because of the characteristics imparted to the film by such process and apparatus.

SUMMARY OF THE INVENTION

The present invention comprises a process whereby tubular film is extruded from a conventional tubular extrusion die across one or more air bearings to fix the film in position. The extruded tube is stretched about two or three to one transversely while simultaneously being stretched about ten to one or more in the machine direction. This imparts a high degree of orientation into the extruded product to increase its tear strength.

Shortly after the film has formed adjacent the extrusion die, the film is selectively contacted by a cooling means generally opposite the air bearing to form a plurality of narrow strips or ribs where the melt is selectively cooled more than it is naturally cooled in the process as shown in the aforesaid U.S. Pat. No. 3,976,733. The selective cooling raises the melt tension of the resin in this highly cooled area so that it does not stretch as much tranversely as the adjacent warmer film. This higher melt tension forms a sharp rib in the film body. A criss-crossed rib pattern of such ribs can be formed by counter-rotating a plurality of cooling mechanisms providing a built-in link-type configuration. The pattern of sharply defined ribs provides substantially increased mechanical film toughness without a significant increase in film weight, or average thickness. Cooling can be provided by impinging upon the extruded film a gas, such as air, a mist, such as water vapor, or snow. In each case, a mechanism allowing for cooling devices to carry the mist, gas or snow about the extruded film can be employed. Alternately, water-wick or metal contact devices can be employed to provide thickened ribs in a similar pattern about the tube as it is being longitudinally stretched upon extrusion. A quench mandrel can aid in speeding up the process where desired. The cooling mechanisms can be located either internally or externally of the extruded tubing to achieve the desired result.

A film not only of increased strength is achieved but also one which can be multilayered to present a visible rib by use of layers having contrasting colors.

BRIEF DESCRIPTION OF THE DRAWING

FIG. 3 is a view like FIG. 2 only showing a modified form of the invention embodying water-wetted wicks;

FIG. 6 is yet another modified form of the arrangement shown in FIG. 4;

FIG. 6A is a view of the arrangement of FIG. 6 taken along reference line 6A—6A thereof;

FIG. 7 is an elevational view, partially broken away, of a two-ply bag made from the film produced by the process illustrated in FIG. 1; and FIG. 8 is a cross-sectional view of the bag of FIG. 7 taken along reference line 8—8 thereof.

DETAILED DESCRIPTION OF THE PREFERRED EMBODIMENTS

Figure 1:
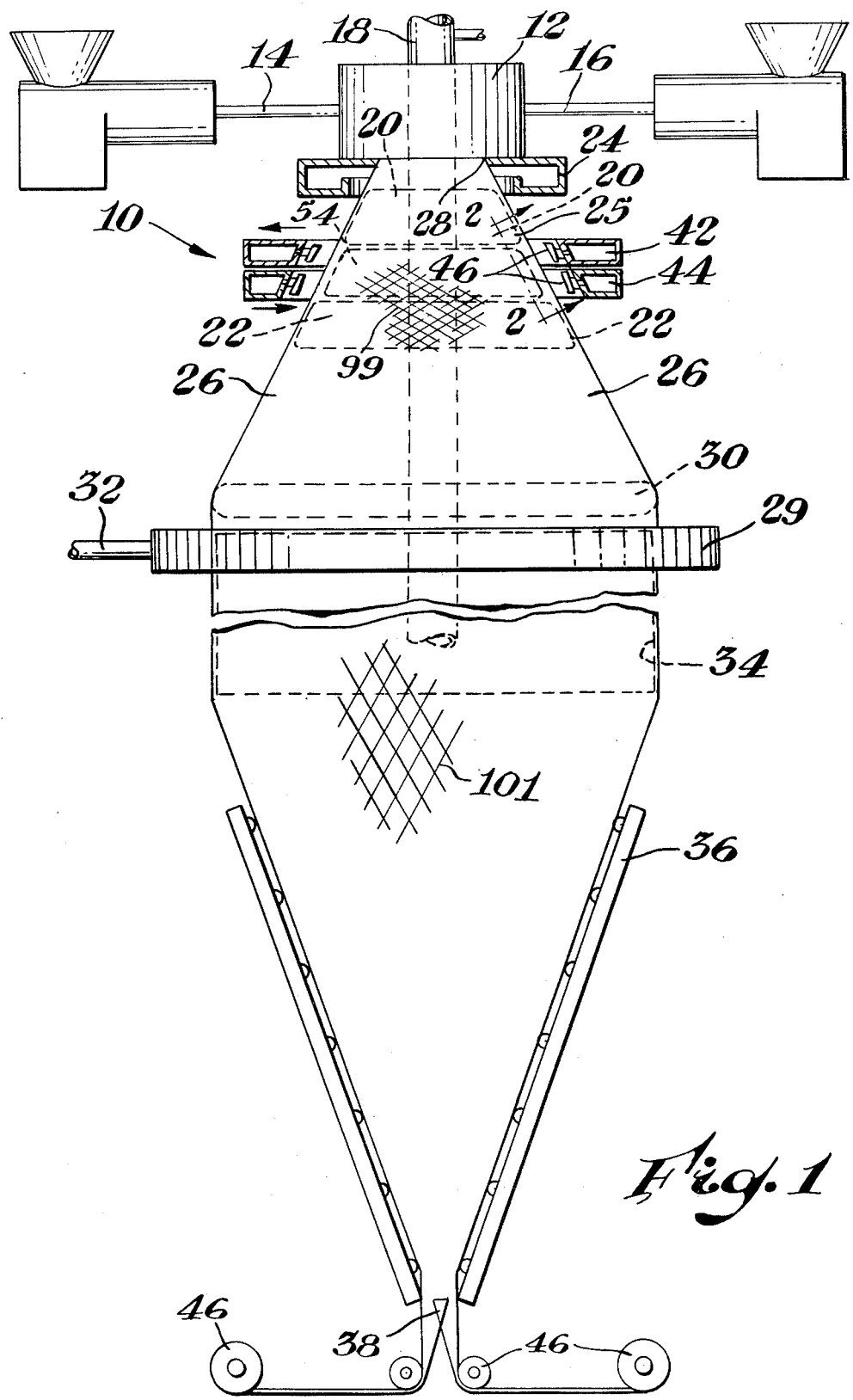
FIG. 1 is a schematic representation of a preferred embodiment of the apparatus and process of the invention.

In FIG. 1 there is schematically depicted, partly in section, an apparatus of the present invention generally designated by the reference numeral 10. This apparatus 10 is basically the apparatus described in U.S. Pat. No. 3,976,733 only modified to perform the function of extruding a thin film with a rib pattern so as to greatly enhance its tear strength. The preferred pattern is cross-ribbed and the invention will be described with that pattern primarily in mind, even though other patterns using the principles of the invention may be employed. Many portions, of the apparatus shown in FIG. 1 herein are like those shown, for example, in FIG. 1 of U.S. Pat. No. 3,976,733 and perform essentially the same functions. Principally, an extruder die 12 is fed by one or more resin pipes 14 and 16, depending on the number of layers desired to be formed. A multilayered die such as shown in U.S. Pat. No. 3,354,506 can be employed to form more than one layer, for example. This permits obtaining a more visible rib with layers of contrasting colors.

Through the center of the die 12 is a supporting cylinder 18 which is also a supply means for introducing cooling fluid to upper and lower gas bearings 20 and 22, respectively. These gas bearings provide support for fixing the film in a specific position. A cooling gas means, in the form of a conventional air ring 24, is applied externally of the tubular extrudate or film 26 adjacent the extrusion die orifice 28. A third gas bearing 30 and a tube positioning means 29, the latter being supplied from the gas source 32, are also provided for film control during cooling. Bearing 30 is supplied with gas in a manner similar to that of the bearings 20 and 22. A quenching mandrel 34 can be employed to rapidly cool the balance of the film extrudate. A collapsing rack 36, end slitter 38 and take-off rollers 46 are found at the lower end of the system of FIG. 1 and function in a manner similar to that described in the aforesaid U.S. Pat. No. 3,976,733 patent.

Generally adjacent, but located below upper bearing 20 and above lower bearing 22, are a pair of counter-rotating nozzle ring devices 42 and 44, generally circumferential in cross-section in a plane normal to the axis of extrusion as are the bearings 20 and 22. For example, upper nozzle ring 42 can move clockwise while lower nozzle ring 44 can move counter-clockwise about the film 26. These ring apparatuses contain nozzles 46 for impinging a cooling fluid upon the exterior surfaces of the film as it passes thereby. Air bearings 20 and 22 are located adjacent upper air ring 24 so that the nozzles 46 can impinge cooling medium upon the surface of the film at a point where the film has solidified enough to maintain its body but has not yet solidified beyond its normal forming temperature. The closer the cooling mechanisms are to the zone in which the film is initially extruded the more affect they can have in forming the desired cross-patterned rib having increased thickness. However, the degree of thickness can be adjusted by moving the nozzle ring apparatus upwardly and downwardly in the machine direction as desired. Porous air bearing 20 as well as porous air bearing 22 are supplied air through cavity 48 in a conventional manner. This allows the film 26 to pass by the outer surfaces 50 of each of the bearings with a small gap between the bearing and the film so that the air gap 52 provides a slip passage of the film past the air bearings.

The air bearings by being closely adjacent the cooling mechanisms provide support for the film so that as the cooling means impinges upon or otherwise contacts the film surface, the film does not move away from the nozzles and dissipate their effect. Slight increases in the spacing between the nozzles and the film can significantly decrease rib sharpness. The air bearings provide controlled film location and controlled rib definition as desired. For example, in experimentation it has been found that the nozzle orifices perform well if the distance X between the squench former face 64 and nozzle face 57 of FIG. 2 is 1 to 20 times the gap Y of orifices 60 (FIG. 2A), later described, and preferably 1 to 10 times the gap.

A liquid can be supplied to the quench former 54 through passageways 56 through a water baffle 58, the water baffle providing a more uniform quench-forming temperature. Nozzles 56 are angularly disposed with respect to the face of the die 28, which will ordinarily be horizontal, at about 45°± about 20°, and emit their cooling means through orifices 60 which can, for example, be disposed about 90° from one another as shown in FIG. 2A. Coolants supplied through channels 62 supply the orifice 60, which fluid impinges upon the outer surface of film 26 to push it against the surface 64 of quench former 25 so that a pronounced sharp rib effect is achieved. Otherwise the film is spaced from surface 64.

Figure 2:
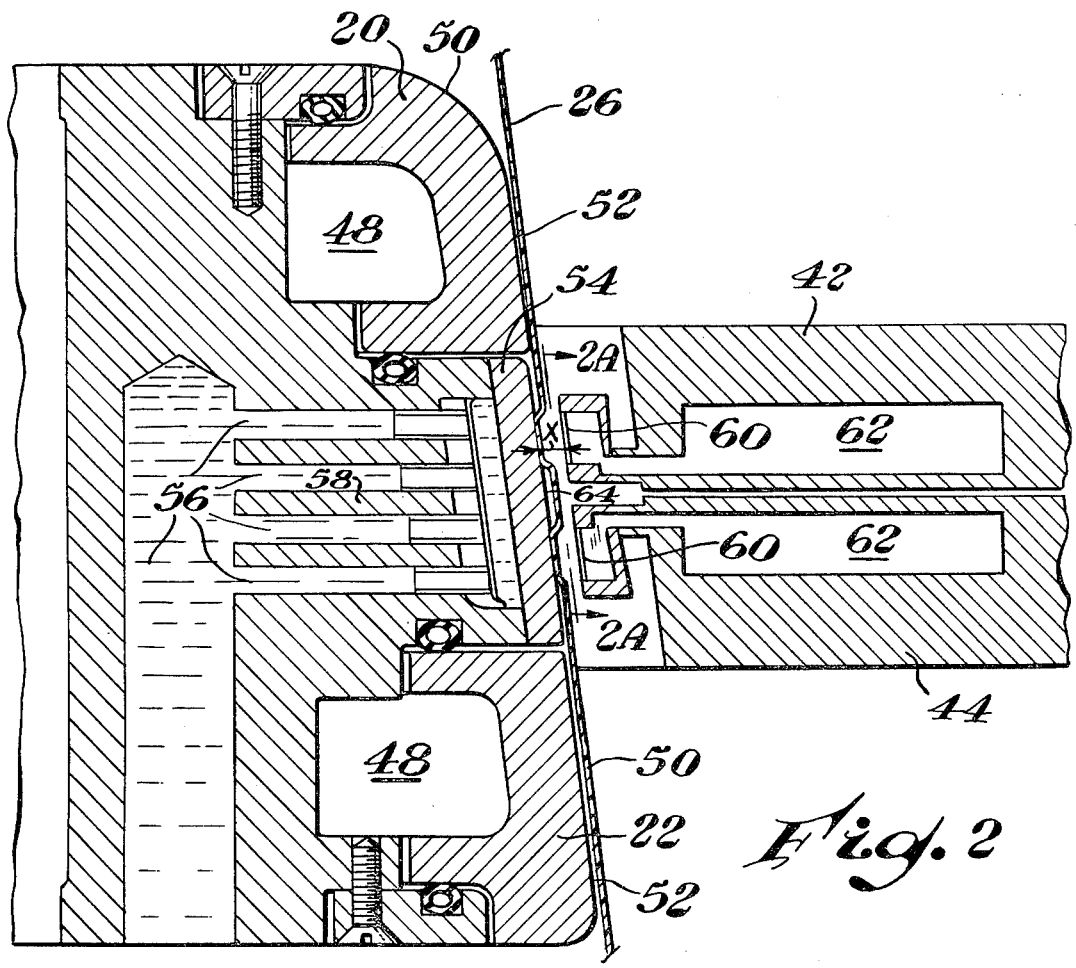
FIG. 2 is an enlarged cross-sectional view of the quench former portion of the apparatus of FIG. 1 taken along reference line 2—2 of FIG. 1.
Figure 2A:
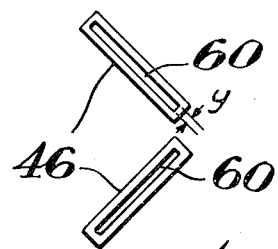
FIG. 2A is an enlarged view of the cooling nozzles of FIG. 2, taken along line 2A—2A thereof.

A modified form of the rib forming apparatus of the present invention is found in the cross-section of FIG. 3, the principle difference between this apparatus and that described with respect to FIG. 2 being that the quench former 25 has been removed and instead of nozzles 60 blowing a coolant against the exterior film, water-wetted wicks 68 and 70 contact the surface of film 26 at locations 72 and 74. The wicks severely cool the film at such contact areas to form an extra-sharp cross-rib pattern where desired. Water wetted wicks 68 and 70 are carried by counter-rotating wick ring apparatuses 76 and 78 which are rotated by any well known means, not shown, and are supplied by a fluid delivery system engaged directly with the wicks through channels 80 in any convenient manner as can be developed by one skilled in the art. Again, air bearings 20 and 22 fix the film in position so that the location of cooling wicks 68 and 70 can be maintained with respect to the film surface. In this case, the fluid 81 contained in the wicks is in direct contact with the film surface.

Figure 4:
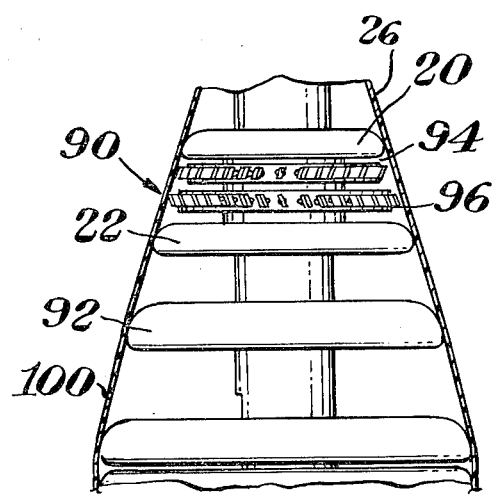
FIG. 4 is a schematic representation of apparatus like that shown in FIG. 1 only with the cooling mechanism located within instead of outside the tubular extrusion.

Yet another modified form of the present invention is that shown in FIG. 4. FIG. 4 is somewhat like FIG. 1 only internal cooling mechanisms are employed and an extra air bearing 92 for added support is located in this modified system 90.

Figure 5:
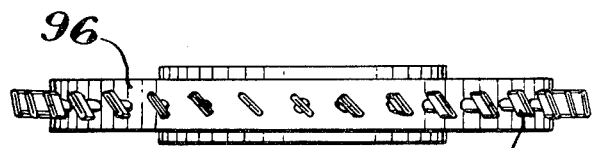
FIG. 5 is an enlarged view of one of the rings of FIG. 4.

In the embodiment shown in FIG. 4, spaced internal air or coolant rings 94 and 96 are located between bearings 20 and 22. These rings being essentially in the location of the quench former 25 of apparatus 10. The internal air rings 94 and 96 are also counter-rotating so as to provide an internal cross-ribbed effect on the tube. The rings are circular in plan view. One such ring is shown in expanded detail in FIG. 5. The nozzles 98 shown in this view are angled at about 60° in this particular embodiment to the face of the die 28, the angle determining the width of the rib formed on the internal surface 100 of the film 26.

The bearings 20 and 22, with tension supplied to the film 26 by take-off rollers 46, maintain the film in a spaced location from the nozzles 98 so that the film distance to provide sharp ribs is achieved.

Yet another modified form of the present invention is shown in FIGS. 6 and 6A where instead of cooling nozzles 46, narrow slits 102 and 104 are formed through a pair of porous glass bearings 106. This permits a high velocity of air passage through the slits, while the rest of the bearings act in a customary way to locate the film and form an air slip. In such case, one can expect the ribs to be wider and not as pronounced as in the embodiment of FIG. 5. In all other respects, however, the function of the apparatus of FIG. 6 is like that in FIG. 5.

The present invention has been operated successfully, producing ribs by cooling with air, air/water mist, ice, dry ice, metal shoes, and by using an air nozzle to force the film against a smooth quench former as is illustrated particularly in FIG. 1, for example. This last method gives dual cooling, both the air and the quench former contributing to the cooling of the rib.

Basically, thermoplastic tube or film 26 is extruded over one or more air bearings 20, 22, and 30, with the tube being only partially expanded at the location where the cooling means for generating the ribs on the film is operating. In the case where only cooling air is used, for example, an air bearing can be located in place of the cooling mandrel 25 of FIG. 1. This particularly true where more accentuated ribs and/or high extrusion rates are not critical.

The ribs are generated by blowing a narrow stream of gas, mist, or snow at a high velocity against the film as it passes over an air bearing or quench former. This cools a narrow strip of film reducing its tendency to stretch in the transverse direction. The result is the thickened web in the film. In each case, whether cooling with a gas, a water mist, or snow formed by ice or dry ice, certain design or process parameters have been determined to provide the desired result. The exit nozzle 46 may be round, rectangular or curved. The nozzle gap or diameter 60 may be from 0.005 inch to 0.050 inch with the preferred range being 0.010 inch to 0.030 inch. The nozzle 46 may be perpendicular to the surface film 26 or it may be 10 to 40 degrees off perpendicular, giving a sharp thickness increase on one edge and a gradual increase on the other edge of the rib. The clearance between the nozzle 46 and the film 26 may be 0.050 inch to 0.300 inch with preferred range being 0.10 inch to 0.15 inch. The spacing between nozzles 46 may range from 0.3 inch to 3.0 inches with the preferred range being 0.60 inch to 1.5 inches.

The expansion of the tube at the nozzles 46 should be in the range of −10% (due to necking in) to 75% of the total expansion, with the preferred range being (−10%) to 25% of the total expansion to obtain the greatest rib sharpness or definition. It is desirable to contact the film with the cooling means before the film expands too far. Nozzles 46 may be stationary and oriented vertically for producing vertical ribs or set at opposed 45° or another angle and counter-rotated to generate a mesh film pattern. Optionally, the nozzles 46 may be internal as shown in FIG. 4 with an external air bearing (not shown), if desired. A simpler system employing a single air bearing in place of the sandwich comprising an air bearing/water cooled mandrel/air bearing, as illustrated in FIG. 1 may be used. However, with the omission of the mandrel, supplementary cooling for the ribs is lacking, resulting in less production rate capability. For increased sharpness, a pair of nozzles with an included angle of about 90-120 degrees may be used in place of each nozzle 46, the air tending to exit between the nozzles to concentrate the multiple coolant flow to the rib zone on the film. The cooling methods of this invention may also be appplied to a simple blown film process as well as the process taught in U.S. Pat. No. 3,976,733.

FIGS. 2 and 2A illustrate in more detail the operation of the invention where a liquid-cooled mandrel is used. Here air enters through cavities 48 through bearings 20 and 22 to push the inner surface of the film away from outer surface 50 of each bearing so as to establish air slip gap 52 therebetween. As the film passes by cooling mandrel 54, its outer surface 64 is contacted by the film directly opposite exit orifice 60 of the nozzles which causes the film to contact the cooling mandrel as it is extruding downwardly past lower bearing 22. Coolant liquid such as cooled water, passes through channels 56 and passage 58 to provide the increased coolant effect necessary for the rapid cooling to occur. While the film is passing by the nozzles, the nozzles, which are carried by circumferential rings 42 and 44, rotating counter to one another, form thickened ribs in the surface of film 26 which criss-cross one another as the film is extruded down past lower bearing 22.

An illustration of the criss-cross pattern can be found not only generally on FIG. 1 but in more detail in the embodiment of FIGS. 7 and 8. The diamonds formed by the ribs when initially formed near the bearing 20 take on a much different shape and size as the tube expands over bearing 30. The diamond-shape expands laterally and longitudinally as the film is expanded and in about the same proportion. Since the tube is expanded much more in the longitudinal (machine) direction than the lateral (transverse) direction, the diamond 101 will become relatively much taller than when initially formed as diamond 99. The center of the diamond will become thinner upon expansion but will not significantly lose its toughness because it becomes highly oriented since substantially all of the expansion occurs in the material between the ribs. Any tearing in the center of the diamond will customarily stop at a rib rather than continue to zipper through the film body. FIG. 7 shows a bag 110 having criss-cross parallel ribs 112 and 114 having a profile B and which cross at point A. Ribs 112, for example, could be formed by the nozzles 46 carried by rotating ring 42 and the ribs 114 could be formed by the nozzles 46 carried by oppositely directed ring 44. The thickness B of the rib, if the film were given a unit of one, for example, could be 2, and at a cross-rib the thickness A could be 3. Specific thickness can be found in Table I, for example, where samples were compared with a Control F2-1 having a nominal thickness at about the same as each of the samples of F2-2, J-2 and F4.1. The "X-Rib" section of the samples are equivalent to the thickness A on FIGS. 7 and 8, the "Rib" is comparable to the thickness B shown at ribs 112 and 114 of the drawing and the "Diamond" being that portion of the film 110 between the ribs, as expanded, and shown in FIG. 7. The machine direction and transverse direction, tear strength as measured using a Elmendorf tester, typically shows the increased strength achieved by practice of the present invention. These results were obtained using only air cooling against an air bearing. Considerably improved results can be obtained using supplemental cooling means as with a water-cooled mandrel of FIGS. 1 and 2 or water wicks or metal shoes, later described, as contemplated by the embodiment of FIG. 3, for example. Cooling with a quench former, with an air nozzle 10 as illustrated in FIG. 1, for example, can be about ten fold over that found with just air nozzles alone. If the air is replaced with an air water mist, the improvement can be in the magnitude of 30 fold. If water cooling is achieved with moistened wicks as taught in the embodiment of FIG. 3, for example, the improvement can be 50 fold or more.

TABLE 1

| Sample No. | Gauge - Mils | | | | Tear-gms | | Rate | Nozzles | | | |
|---|---|---|---|---|---|---|---|---|---|---|---|
| | Nom. | X-Rib | Rib | Diamond | Md | Td | Lbs/Hr | Rpm | Psi | Air fpm | Angle |
| F2-2 | 1.62 | 3.15 | 2.27 | 0.97 | 417 | 692 | 170 | 5.2 | 5 | 7500 | 60 |
| F2-1 | 1.51 | Control | | | 167 | 477 | 170 | — | — | — | — |
| J-2 | 1.57 | 3.74 | 2.45 | 0.76 | 302 | 690 | 200 | 4.4 | 7 | 8400 | 60 |
| F4-1 | 1.55 | 3.58 | 2.42 | 0.86 | 285 | 712 | 200 | 4.0 | 7 | 8400 | 60 |

The preferred embodiment or best mode for a particular application, of course, depends on not only the degree of cooling and rib formation formed but also counter-balanced against the complication or the rate of speed obtainable with the varying modes for accomplishing the various species of the present invention.

For example, in FIG. 3 a water wick made of felt, cotton, or synthetic fabrics which are water absorbent can be fed by water supplies to channel 80 engaging the outer surface of the film 26 at points 72 and 74 to cool narrow strips of film to thicken the same. The wicks contacting the film in close proximity to one or more air bearings 20 or 22. In this arrangement, a water delivery system must be provided for the wicks. Particularly, the water wicks 68 or 70 may be round, rectangular, or curved. The wick width or diameter may be from 0.01 inch to 0.50 inch and preferably 0.10 inch to 0.30 inch. The wicks may be optionally mounted in an air bearing flush with the air bearing or extending up to 0.125 inch. The spacing between the wicks may range from 0.30 inch to 3.0 inch with the preferred range being 0.60 inch to 1.5 inches. The expansion of the tube at the wicks should be in the range of −10% to 75% of the total expansion, with the preferred range being −10% to 25% of the total expansion. The wicks may be vertical and stationary producing vertical ribs in the film, set at an angle and rotating for diagonal ribs, or two sets of wicks set at opposed angles may be counter-rotated to produce a mesh film.

Metal shoes (not shown) may replace the water wicks of FIG. 3 and can be located either internally or externally of the film. Such metal shoes must be cooled by known heat exchange methods and need to have an air bearing in close proximity to maintain the film in proper contact with the metal shoe while avoiding snagging and sticking. The shoe or shoes and adjacent air bearings are brought into contact with the film, with the cooled metal shoe providing the selective cooling of the film, the shoes are carried by rotating rings in a manner similar to the previous embodiments disclosed. Particularly, the shoe may be round, rectangular, or curved.

The shoe width may be from 0.010 inch to 0.050 inch, preferably 0.10 inch to 0.30 inch. The shoes may actually be inserted in an air bearing (as in slits 102 and 104 of FIG. 6, for example) flush with the air bearing surface or extending up to 0.125 inch beyond the surface. The spacing between the metal shoes may range from 0.30 inch to 3.0 inches with the preferred range being 0.60 inch to 1.5 inches. The expansion of the tube at the metal shoes should be in the range of −10% to 75% of the total expansion, with the preferred range being −10% to 25% of the total expansion. The shoes may be vertical and stationary producing vertical ribs on the film, set at an angle and rotating together for diagonal ribs or two sets with opposite angles and counter rotation for mesh pattern. Maintaining the shoe at a temperature below the dew point provides a wetted shoe cooling method. When operating below the freezing point of water, an ice film tends to form on the shoes resulting in a shoe that "skates" across the film surface This provides minimal friction and extreme cooling.

Many factors can vary the degree and sharpness of the rib profile and of the tear strength. Again, this is an arrangement whereby simple air cooling against an adjacent air bearing is employed. Increasing the air velocity of the cooling nozzles from 9400 fpms to 13,500 fpms can increase by more than 20 percent the tear strength of the resulting film at least in the machine direction. It should be pointed out there are other examples of which the above are typical. Various factors changed as conditions were changed but the overall results typified by the above are what can be commonly expected by applications of the principles of the present invention.

Tear strength of thermoplastic materials which are ribbed according to the principles of the present invention has a direct relationship to rib sharpness. By use of the present invention, a high degree of rib sharpness can be obtained. The relationship of rib sharpness to tear strength is, as the height to width ratio increases, the tear strength can advance to over 100 percent of what it would have been otherwise but for the present invention. The limitation on the rib height is primarily attributed to a thickness which will not interfere with the packing of the bags into a box. A certain degree of compactness is necessary for market purposes. The present invention has been found to provide a high degree of rib sharpness while maintaining necessary compactness. A typical rib made by this invention for a film having a nominal thickness of 1.5 mils could have a rib height of about 3 mils, and a width of from about 40 to 120 mils.

While certain representative embodiments and details have been shown for purpose of illustrating the invention, it will be apparent to those skilled in the art that various changes and applications can be made therein without departing from the spirit and scope of the invention. For example, the speed of rotation of the cooling mechanisms, size and shapes of the nozzles can be modified to fit particular resin materials or combinations of resin materials being extruded and the operating conditions under which the materials are extruded. Additionally, the particular spacing of the ribs from one another, the shapes of the diamonds between the ribs can be best determined for a particular application by those skilled in the art applying the principles of the present invention. Likewise, the layers of a coextruded film may be made such that the ribbed layer is particularly heavily pigmented but thinner than the other layer or layers, so that the ribs stand out as a distinctly contrasting color. Much flexibility in making novel products is possible following the principles of the present invention. Having 30 or more ribs per foot of film width is feasible, for example.

What is claimed is:

1. A thermoplastic film having an integral ribbed pattern thereon, said ribs having a rib sharpness sufficient to permit a large number of ribs per film width to be present in said pattern, the ribs having a thickness at least twice that of the film body between the ribs, the relatively thin film body between the ribs being oriented for toughness, said ribs preventing tear propagation should said film body become ruptured.

2. The film of claim 1 wherein the width of each of these ribs is from about 27 to about 80 times the thickness of the film body.

3. The film of claim 1 wherein said ribs form a mesh pattern, the thickness of the ribs at their crossing being at least three times the thickness of the film body providing points of increased strength greater than that found in the rest of the ribbed film.

4. The film of claim 3 wherein the film is comprised of a plurality of layers, said ribs being formed in one of said layers, say ribs being pigmented no differently than said layer from which it is formed and having a contrasting color with respect to the body of the film.

5. A bag having the thick, sharp ribs providing improved toughness is formed from the film of claim 4.

* * * * *

REEXAMINATION CERTIFICATE (755th)
United States Patent [19]
Havens

[11] B1 4,315,963
[45] Certificate Issued  Sep. 8, 1987

[54] THERMOPLASTIC FILM WITH INTEGRAL RIBBED PATTERN AND BAG THEREFROM

[75] Inventor: Carl B. Havens, Newark, Ohio

[73] Assignee: The Dow Chemical Co., Midland, Mich.

Reexamination Request:
No. 90/000,805, Jun. 18, 1985

Reexamination Certificate for:
Patent No.: 4,315,963
Issued: Feb. 16, 1982
Appl. No.: 170,217
Filed: Jul. 18, 1980

Related U.S. Application Data

[62] Division of Ser. No. 75,477, Sep. 14, 1979, Pat. No. 4,265,853.

[51] Int. Cl.$^4$ ............................................. B65D 85/30
[52] U.S. Cl. ....................................... 428/35; 428/36; 428/163; 428/166; 428/167; 428/172; 428/213; 428/323; 264/519; 383/119
[58] Field of Search ............... 428/163, 167, 169, 172, 428/36, 35

[56] References Cited

U.S. PATENT DOCUMENTS

| | | |
|---|---|---|
| 2,750,631 | 6/1956 | Johnson . |
| 3,193,604 | 7/1965 | Mercer . |
| 3,265,789 | 8/1966 | Hofer . |
| 3,405,027 | 10/1968 | Wyckoff . |
| 3,984,047 | 10/1976 | Clayton et al. . |
| 4,015,635 | 4/1977 | Guransson . |
| 4,076,121 | 2/1978 | Glayton . |
| 4,112,034 | 9/1978 | Nash . |
| 4,209,475 | 6/1980 | Herrington . |
| 4,229,407 | 10/1980 | Craig . |
| 4,237,889 | 12/1980 | Gobran . |

FOREIGN PATENT DOCUMENTS

| | | |
|---|---|---|
| 2158098 | 7/1972 | Fed. Rep. of Germany . |
| 1529222 | 10/1978 | United Kingdom . |

OTHER PUBLICATIONS

Lawrence E. Dowd, "What Happens When You Cool and Draw Blown Films?", *SPE Journal*, Mar. 1972–vol. 28.

*Primary Examiner*—Marion E. McCamish

[57] ABSTRACT

A process and apparatus for producing a ribbed pattern on extruded film by differential cooling of the film during its stretching process. The film is extruded through a tubular film die, stretching as it leaves the die. Cooling mechanisms rotate about the tube as it is being extruded to define a large plurality of narrow strips on the melt as it is being extruded. The film is fixed in space to maintain a close proximity to the cooling mechanisms in order to achieve sharply defined ribs. A cross-ribbed pattern can be obtained by counter-rotating the cooling mechanisms. Increased tear strength is imparted to the film without increasing the amount of resin necessary to make the film. Such tube can be formed into high strength film products such as trash bags and the like.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 3 are determined to be patentable as amended.

Claims 2, 4 and 5, dependent on an amended claim, are determined to be patentable.

New claims 6–15 are added and determined to be patentable.

1. A thermoplastic film having *a film body with an* integral *mesh* ribbed pattern [thereon] *on one surface thereof,* said ribs *formed from the body of the film itself without a significant increase in film weight and* having a *rounded-peak rib shape with sloping sides but having a* rib sharpness sufficient to permit a large number of ribs per film width to be present in said pattern, the ribs having a thickness at least twice that of the film body between the ribs, the relatively thin film body between the ribs being oriented for toughness, said ribs preventing tear propagation should said film body become ruptured.

3. The film of claim 1 wherein [said ribs form a mesh pattern,] the thickness of the ribs at their crossing [being] *is* at least three times the thickness of the film body providing points of increased strength greater than that found in the rest of the ribbed film.

*6. A thermoplastic film having two layers, one of said layers having an integral criss-crossed rib pattern on at least one surface thereof, comprising:*

*a first film layer having an integral ribbed criss-crossed pattern thereon, said ribs being formed in said first film layer from the body of the first film layer itself without a significant increase in film weight and having a rounded-peak rib shape with sloping sides but having a rib sharpness sufficient to permit a large number of ribs per film width to be present in said pattern, the ribs having a thickness at least twice that of the film between the ribs, the relatively thin film between the ribs being oriented for toughness, said ribs preventing tear propagation should said film become ruptured, and*

*a second film layer adjacent to said first film layer.*

*7. The thermoplastic film of claim 6 wherein said ribs are pigmented no differently than said first film layer but have a contrasting color with respect to said second film layer.*

*8. The thermoplastic film of claim 6 wherein said ribs are formed from the body of the first film layer itself without significant increase in film weight by selectively cooling a tubular film extrudite prior to film expansion.*

*9. The thermoplastic film of claim 8 wherein said second film layer is coextruded with said first film layer.*

*10. A bag formed from the thermoplastic film of claim 6.*

*11. A thermoplastic film having a film body with an integral mesh ribbed pattern, said ribs formed from the body of the film itself without a significant increase in film weight by selectively cooling a tubular film extrudate prior to film expansion and having a rounded-peak rib shape with sloping sides but having a rib sharpness sufficient to permit a large number of ribs per film width to be present in said pattern, the ribs having a thickness at least twice that of the film body between the ribs, the relatively thin film body between the ribs being oriented for toughness, said ribs preventing tear propagation should said film body become ruptured.*

*12. The film of claim 11 wherein the width of each of the ribs is from about 27 to about 80 times the thickness of the film body.*

*13. The film of claim 11 wherein the thickness of the ribs at their crossing is at least three times the thickness of the film body providing points of increased strength greater than that found in the rest of the ribbed film.*

*14. The film of claim 11 wherein the film is comprised of a plurality of layers, said ribs being formed in one of said layers, said ribs being pigmented no differently than said layer from which it is formed and having a contrasting color with respect to the body of the film.*

*15. A bag having the thick, sharp ribs providing improved toughness formed from the film of claim 14.*

* * * * *